(12) United States Patent
Peters et al.

(10) Patent No.: US 8,764,525 B2
(45) Date of Patent: Jul. 1, 2014

(54) POULTRY NECK MEAT HARVESTER AND METHOD FOR MECHANIZED HARVESTING OF POULTRY NECK MEAT

(75) Inventors: Erik Hendrikus Werner Peters, Boxmeer (NL); Petrus Christianus Hendrikus Janssen, Wilbertoord (NL)

(73) Assignee: Marel Stork Poultry Processing B.V., Boxmeer (NL)

( * ) Notice: Subject to any disclaimer, the term of this patent is extended or adjusted under 35 U.S.C. 154(b) by 0 days.

(21) Appl. No.: 14/115,674

(22) PCT Filed: Apr. 24, 2012

(86) PCT No.: PCT/NL2012/050274
§ 371 (c)(1),
(2), (4) Date: Dec. 18, 2013

(87) PCT Pub. No.: WO2012/154035
PCT Pub. Date: Nov. 15, 2012

(65) Prior Publication Data
US 2014/0094102 A1      Apr. 3, 2014

(30) Foreign Application Priority Data

May 6, 2011   (NL) .................................. 2006732

(51) Int. Cl.
*A22C 18/00* (2006.01)
(52) U.S. Cl.
USPC ........................................................ 452/165
(58) Field of Classification Search
USPC .......... 452/149–151, 153, 154–156, 165–168
See application file for complete search history.

(56) References Cited

U.S. PATENT DOCUMENTS

| 2,851,362 | A |   | 9/1958 | Goldberg |
| 3,781,945 | A | * | 1/1974 | Taylor ........................... 452/106 |
| 4,097,960 | A | * | 7/1978 | Graham et al. ............... 452/168 |
| 4,213,228 | A | * | 7/1980 | Komatsu et al. .............. 452/136 |
| 4,574,427 | A | * | 3/1986 | Harben et al. ................. 452/117 |
| 4,894,885 | A | * | 1/1990 | Markert .......................... 452/53 |
| 5,913,720 | A |   | 6/1999 | Scott et al. |
| 5,938,517 | A | * | 8/1999 | Vineyard et al. ............... 452/63 |
| 6,033,296 | A |   | 3/2000 | Herman Winkelmolen |
| 8,585,476 | B2 | * | 11/2013 | Mullen ............................ 463/1 |

FOREIGN PATENT DOCUMENTS

EP         0258480 A1    3/1988

* cited by examiner

*Primary Examiner* — Richard Price, Jr.
(74) *Attorney, Agent, or Firm* — Birch, Stewart, Kolasch & Birch, LLP (57) ABSTRACT

A poultry neck meat harvester for mechanized harvesting of neck meat from a poultry body is adapted to be arranged along the path of a poultry body conveyor having at least one product carrier for supporting a poultry body and conveying the poultry body in a direction of conveyance. The harvester includes one or more neck positioning devices, each adapted to receive and position the poultry neck portion of a poultry body that is supported by a product carrier, a neck conveyor with neck positioning devices adapted to convey each neck positioning device in a manner that is synchronized with a product carrier so as to allow receipt of the poultry neck portion while the poultry body is supported by the product carrier, a neck meat cutting member adapted to cut loose the neck meat from the neck vertebrae while the neck portion is received and positioned by the neck positioning device.

20 Claims, 10 Drawing Sheets

POULTRY NECK MEAT HARVESTER AND METHOD FOR MECHANIZED HARVESTING OF POULTRY NECK MEAT

The present invention relates to a method and device for mechanized harvesting of poultry neck meat, e.g. from chicken. The neck meat is harvested from a poultry body of poultry that has been slaughtered, deheaded, and eviscerated during prior operations which are commonly effected in a poultry processing plant. The poultry body from which the neck meat is harvested comprises a carcass part having at least part of the rib cage and part of the meat which is naturally present thereon and having a neck portion with neck vertebrae and at least part of the meat which is naturally present on said neck vertebrae. The neck portion is preferably deskinned prior to the neck meat harvesting.

For slaughtered poultry to be divided into parts which are attractive to the consumer, it is conventional for the poultry to be supplied to a dividing line of a poultry processing plant. In this line the poultry is conveyed by a conveyor which is guided past a number of processing stations. A known dividing line generally comprises a station in which the front half of the carcass, comprising the breast and that part of the back which directly adjoins it, and the back half of the carcass, which comprises the legs and that part of the back which connects the legs, are separated from one another. The back half of the carcass is processed further in the dividing line while still hanging by its legs, whereas the front halves are transferred to a separate filleting line in order to be processed further.

In conventional processing in a processing plant the neck portion—comprising neck vertebrae, neck meat and possibly neck skin—is separated as a whole from the carcass part while it is in the dividing line or in the filleting line. In some countries, such as Japan and the USA, the selling price of poultry neck meat is reasonable and therefore it is known to harvest the neck meat in a manual process from these separated neck portions.

The object of the present invention is to improve the neck meat harvesting process and provide a neck meat harvester, preferably such that the process can be carried out in a mechanized manner, preferably at a suitable station along a dividing line or filleting line of a poultry processing plant.

This object is achieved by a poultry neck meat harvester according to claim 1 and a method for automatically harvesting poultry neck meat according to claim 17.

The poultry neck meat harvester is adapted to be arranged along the path of a poultry body conveyor having at least one product carrier embodied to support a poultry body and to convey said poultry body in a direction of conveyance.

When in operation the poultry body conveyor conveys on each product carrier thereof a slaughtered, deheaded, and eviscerated poultry body comprising a carcass part having at least part of the rib cage and part of the meat which is naturally present thereon and having a neck portion with neck vertebrae and at least part of the meat which is naturally present thereon.

Preferably the neck portion has been deskinned prior to operation of the neck meat harvester, but it is also envisaged that skin can still be present on the neck portion as the neck meat is harvested.

The poultry neck meat harvester comprises:
- one or more neck positioning devices, each adapted to receive and position the poultry neck portion of a poultry body that is supported by a product carrier of the poultry body conveyor,
- a neck conveyor comprising the one or more neck positioning devices, said neck conveyor being adapted to convey each neck positioning device in a manner that is synchronized with a product carrier so as to allow to receive—at a receiving position—the poultry neck portion whilst the poultry body is supported by the product carrier of the poultry body conveyor,
- a neck meat cutting member that cuts loose the neck meat from the neck vertebrae whilst the neck portion is received and positioned by the neck positioning device.

The present invention also relates to the combination of a neck meat harvester and a poultry body conveyor.

The present invention also relates to a neck meat harvesting system, comprising a neck meat harvester and possibly also a poultry body conveyor.

Preferably the poultry body conveyor is adapted for conveying the poultry body at a constant speed along the neck harvester, but in an alternative the poultry body conveyor is adapted for step-by-step conveyance or conveyance with a non-constant speed along the neck meat harvester.

The poultry body conveyor may be adapted so as to have a path extending along not only the neck meat harvester, but also along one or more additional poultry body processing stations wherein one or more operations other than the harvesting of the neck meat are carried out on the poultry body, e.g. cutting operations, e.g. for removal of wings from the poultry body. The present invention also relates to a processing system including said poultry body conveyor, the neck meat harvester, and said one or more additional poultry body processing stations, wherein said neck meat harvester and said one or more additional processing station are located along the common poultry body conveyor.

It is also envisaged that in an embodiment a neck meat harvesting system is composed of a neck meat harvester and a dedicated poultry body conveyor having a path of conveyance leading solely past the neck meat harvester.

In a preferred embodiment the neck meat cutting member is arranged at a cutting position along the path of the neck conveyor, said cutting position being downstream of the receiving position. In an alternative embodiment each neck positioning device is provided with an associated neck meat cutting member that travels along with the neck positioning device.

Preferably the neck conveyor is an endless conveyor having a path of which a section is substantially parallel to the path of the poultry body conveyor. Said section may be rectilinear, but it is also envisaged that said section can be curved.

A curved path of the neck conveyor may e.g. include a turret machine design of the neck conveyor, wherein the neck positioning devices are conveyed in circular manner about a substantially vertical axis of rotation. The poultry body conveyor may then suitably have a loop section at the location of the turret machine type neck meat harvester, possibly the poultry body conveyor also being integrated in the turret type neck meat harvester as a dedicated poultry body conveyor.

The cutting action performed by the neck meat cutting member of the neck meat harvester preferably causes a cut throughout the width of the neck, from one side to the other side of the neck, generally parallel to the vertebrae and preferably between a point adjacent the rib cage to the free end of the neck portion. Preferably the cut is made from a starting point adjacent the rib cage towards the free end of the neck, but other approaches are also possible.

Preferably the cutting action of the harvester causes a complete loosening of the neck meat as a single integral meat piece from the vertebrae of the neck of the poultry body, e.g. allowing the neck meat piece to be collected for sale or further processing, e.g. as it drops into a neck meat collector. It is however also envisaged that this cutting action does not fully release the neck meat piece from the poultry body, e.g. as skin is present in the neck area which forms a residual connection with the rest of the poultry body, thereby requiring an additional subsequent release action to be performed to harvest the neck meat, preferably again the neck meat being retrieved as a single meat piece from the neck portion of the poultry body. Said additional release action may e.g. involve the provision of a further cut or a pulling action (either manually or mechanically by a pulling device).

In a less preferred embodiment the neck meat is harvested as multiple meat pieces from a single neck portion, e.g. due to the embodiment of the cutter member that is used for said cutting action.

In a preferred embodiment the neck meat harvester further comprises a neck removal cutter member that is adapted to cut the neck portion from the remaining portion of the poultry body. Such a neck removal cutter member can be any type of cutting member, such as a cutter blade, e.g. an elongated knife, possible having a cutting edge that is converging towards the path of the neck conveyor when seen in direction of conveyance, or alternatively a guillotine-type construction, or alternatively a rotating disc-shape cutter blade.

This neck removal cutter member may be arranged downstream of the location where the neck meat cutting member cuts loose the neck meat from the vertebrae. So the neck meat cutting member is then active whilst the neck portion is still attached to the other portion of the poultry body.

In the alternative the neck removal cutter member is arranged upstream of the location where the neck meat cutting member cuts loose the neck meat from the vertebrae. Thereby, prior to the cutting action of the neck meat cutter member, the neck portion is severed from the rest of the poultry body. This arrangement e.g. allows for diverging paths of the neck conveyor and the poultry body conveyor once the neck portion is cut free by the neck removal cutter member In a preferred embodiment the neck meat cutter member is embodied as a cutting blade. Alternatives to a cutting blade, e.g. a water jet cutting device, are also possible.

In a preferred embodiment a cutting blade is arranged at a cutting position along the path of the neck conveyor so that the cutting blade cuts into a neck portion that is conveyed past the cutting blade by the neck conveyor.

In a preferred embodiment the cutting blade is a stationary cutting blade, but it is also envisaged that the cutting blade may be a mobile cutting blade, e.g. a rotating cutting blade or a pivoting cutting blade.

In a practical embodiment the cutting blade has a sharp tip adapted to create an initial piercing into the neck portion and has a cutting edge arranged to make a cut in the neck portion, generally along the vertebrae, leading away from the initial piercing by the sharp tip.

In a practical embodiment each neck positioning device comprises a gully or similar neck portion receiving cavity, preferably an open topped gully, into which the poultry neck portion, preferably with the breast side of the neck portion at the bottom of the gully, is to be placed at the receiving position. The gully may e.g. be formed in a block of suitable material, e.g. plastic material, or e.g. be formed from a (plastic) tube, or e.g. be formed by a wire mesh structure.

In a preferred embodiment each neck positioning device comprises one or more operable fixation members, e.g. operated by a cam—cam track mechanism associated with the neck conveyor or by an associated (electrical) drive motor, which one or more fixation members are movable between a retracted position allowing the neck positioning device to receive a neck portion and a fixation position wherein the one or more fixation members engage on the neck portion to fix the position thereof with respect to the neck positioning device.

In a practical embodiment the neck position device comprises two operable elongated fixation members that are adapted to engage in a clamping manner on the neck portion at opposed longitudinal sides thereof, preferably with the vertebrae being located generally below the clamped region, preferably the neck meat cutting member being arranged to cut into the neck portion directly above the elongated fixation members.

In a possible embodiment the neck positioning device has a receiving gully for a neck portion that is formed by an optional bottom part and two mobile side parts. It is conceivable that one or both side parts are movable towards each other to position and possibly clamped the neck portion.

In a practical embodiment the neck position device comprises an open topped gully to receive the neck portion therein, and the neck meat harvester comprises an elongated guide, e.g. a rod, extending along, e.g. above, the path of the neck positioning device in the region of the receiving position, such that—in use—the neck portion slides underneath said guide and is thereby lead and/or maintained in the gully. The guiding of the neck portion towards the gully is preferably performed prior to the operation of one or more fixation members for the neck portion if such fixation members are indeed present on the neck positioning device.

In a practical embodiment the poultry body conveyor comprises multiple product carriers that are each adapted to support a poultry body formed as a front half, each carrier comprising a cone or similar support member that is adapted to be introduced into the body cavity of the front half, each carrier supporting the cone thereof so as to be rotatable on command about multiple distinct axes of rotation, e.g. a vertical axis and at least one horizontal axis.

In a practical embodiment the poultry body conveyor comprises product carriers that are each adapted to support the poultry body such that the poultry body is rotatable on command about multiple axis of rotation, e.g. a vertical axis and at least one horizontal axis. The poultry body conveyor is configured to perform rotational motion of the poultry body in order to engage the neck portion thereof with a neck positioning device.

Preferably, the neck conveyor is an endless conveyor wherein a section of the conveyor has a direction of conveyance essentially the same as the direction of conveyance of the poultry body conveyor. Endless conveyors are beneficial in poultry processing plants. Another advantage is that at another section the direction of conveyance can e.g. be parallel with gravity, e.g. allowing for dropping remaining neck vertebrae after the harvesting of the neck meat.

Possibly the neck meat harvester includes a cleaning assembly arranged along the path of the neck positioning devices, allowing to clean the positioning devices, e.g. using a water spray head.

Preferably, the neck meat is harvested by conveying the poultry body and the neck portion still attached to the poultry body in the direction of conveyance towards a cutting blade, this conveyance causing the penetration of the cutting blade into the neck portion and cutting loose the neck meat from the vertebrae.

As indicated above, the invention also relates to a method for mechanized harvesting of poultry neck meat.

Preferably, the harvesting of the neck meat by a neck meat cutting blade takes place while conveying the poultry body with the neck portion in the direction of conveyance, thereby introducing the cutting blade into the neck portion and cutting loose the neck meat from the neck vertebrae. Alternatively, conveyance may be paused to perform said cutting action.

Preferably the method includes separating from the poultry body the remainder of the neck portion from which the neck meat has been harvested.

Preferably, the poultry neck portion is positioned in the neck positioning device by maneuvering a maneuverable product carrier of the poultry body conveyor. Alternatively, a neck portion is positioned in the neck positioning device by maneuvering the positioning device and/or by a separate maneuvering device.

In a possible embodiment the neck meat cutter member is movable between an active position and a non-active position, or is removably mounted in the harvester, e.g. allowing to use the harvester as a neck portion removal device that severs the entire neck portion from the poultry body if harvesting of such complete neck portions is desired.

In a possible embodiment, downstream of the neck meat cutter member embodied to cut loose completely a single piece of neck meat, a trimmer device, e.g. a grinding tool, is located along the neck conveyor, said trimming device being embodied to remove, e.g. as fragments, even more meat from the neck vertebrae, e.g. as a low grade meat product.

The invention is described further in relation to the drawings, in which.

Figure 1:
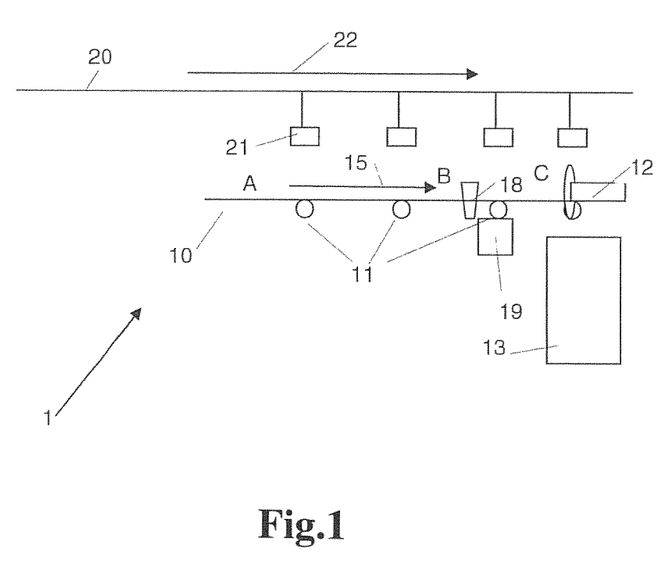
FIG. 1 schematically shows a poultry neck meat harvester according to the present invention.

In FIG. 1 an example of a poultry neck meat harvester 1 according to the present invention is schematically shown. The poultry neck meat harvester 1 is configured for mechanized harvesting of the neck meat from slaughtered, deheaded, and eviscerated poultry bodies comprising at least a carcass part having at least part of the rib cage and part of the meat which is naturally present thereon and a neck portion comprising neck vertebrae and at least part of the meat which is naturally present thereon, at least the neck portion being deskinned. Such a poultry body is not shown in this schematic drawing.

In operation, the poultry bodies are conveyed by a poultry body conveyor indicated with reference number 20. The poultry bodies are each arranged on a product carrier 21 of the conveyor 20, which conveyor 20 conveys the poultry bodies in a direction of conveyance 22 along a path past the neck meat harvester 1.

The method and device according to the present invention can be embodied so as to be suitable for harvesting neck meat from poultry bodies that are each suspended by its legs from a product carrier. Such a carrier is not shown in detail but is known in the art. Alternatively, and more preferred, the method and device according to the present invention can be embodied to harvest the neck meat from a poultry front half, which is conveyed on a carrier of the poultry body conveyor, which carrier comprising a cone or mandrel having a shape that is adapted to fit in the hollow cavity of a bird's body. An example of such an embodiment is shown in detail in FIGS. 2-9.

A neck conveyor 10 comprising one or, as is preferred, multiple neck positioning devices 11 is provided adjacent and essentially parallel to the poultry body conveyor 20. As can be seen the neck positioning devices 11 are conveyed in a manner that is synchronized with the conveyance of the carriers 21, thereby at least allowing for the engagement of the neck portion of a poultry body with the neck positioning device whilst the poultry body is effectively held by the carrier 21. In this example the neck portion remains attached to the poultry body during the harvesting process, so that the synchronized motion of the devices 11 and carrier 21 is maintained during said process. Here the conveyor 20 is moved at a constant speed 21 and the conveyor 10 has essentially the same speed and direction of conveyance 15 as the poultry body conveyor 20.

The neck conveyor 10 here conveys the neck positioning devices 11 at least between a receiving position A wherein a poultry neck portion is received by a neck positioning device 11 while the poultry body is held by the product carrier 21, and an downstream cutting position B wherein the neck meat is cut loose from the neck vertebrae. Both the positioning and cutting will be explained in detail later with reference to preferred or optional embodiments.

According to the shown embodiment, the neck conveyor 10 conveys the neck positioning devices 11 further downstream to a neck removal position C wherein the remaining neck portion—from which the neck meat has already been loosened or completely harvested—is severed from the remaining part of the poultry body. The neck removal will also be explained later in detail with reference to preferred or optional embodiments.

As is preferred the neck conveyor 10 is an endless conveyor wherein only a section of the conveyor 10 has a direction of conveyance 15 essentially the same as the direction of conveyance 22 of the poultry body conveyor 20.

At the cutting position the poultry neck meat harvester is provided with a neck meat cutting blade 18 for cutting the neck meat loose from the vertebrae. This blade 18 here is positioned stationary at a location closely adjacent the path of the devices 11 of the neck meat conveyor 10.

Preferably, the neck meat is cut loose from the vertebrae by conveying the neck portion towards the blade 18, the blade 18 then penetrating into the neck portion and making a cut generally along the vertebrae.

In the shown embodiment a harvested neck meat collection container 19 is provided adjacent the neck meat cutting blade 18 and the neck meat conveyor 10, to collect neck meat severed from the neck portion by the cutting blade 18.

At the neck removal position C the poultry neck meat harvester 1 is provided with neck portion cutting member 12, positioned adjacent the neck meat conveyor 10 and embodied to cut off the remainder of the neck portion from the poultry body still held by the carrier 21.

After passing the neck meat harvester the poultry body can be conveyer further by conveyor 20 for further processing thereof. After the complete removal of the neck portion from the positioning device 11 this neck portion can be collected in the shown neck portion collection container 13.

In FIGS. 2-8 a preferred embodiment of a neck meat harvester 30 according to the invention is schematically and partially shown.

Figure 2:
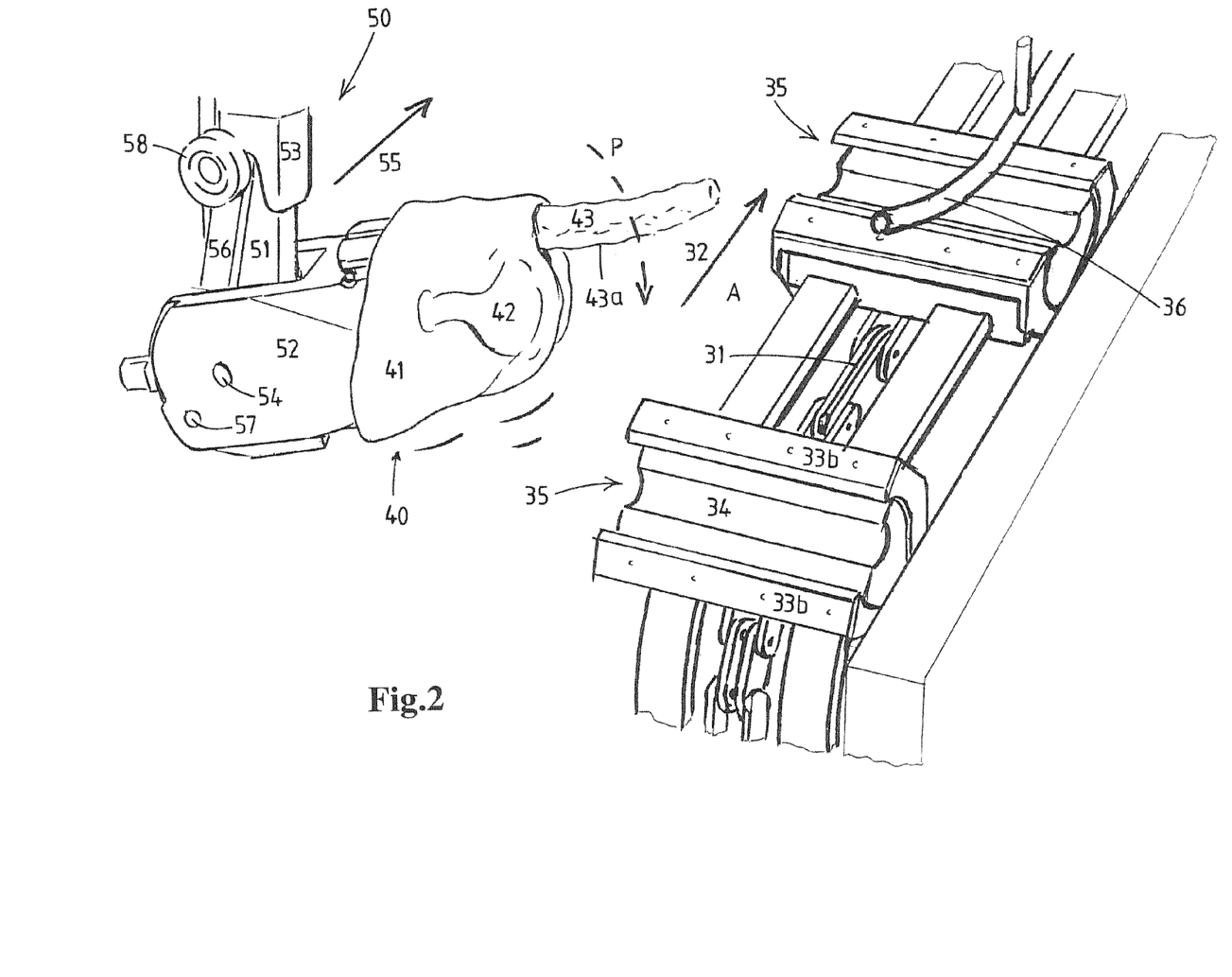
FIG. 2 shows in a perspective view a portion of a poultry neck meat harvester according to the present invention at a positioning position.

A slaughtered, deheaded and eviscerated poultry body is indicated in general with reference number 40. According to the shown embodiment, the poultry body 40 comprises a carcass part 41 having at least part of the rib cage and part of the meat which is naturally present thereon, wings 42 (one of which is visible), together also being referred to as the front half, and a neck portion 43 comprising the vertebrae and at least part of the meat which is naturally present thereon, in this embodiment the poultry body and the neck portion have been deskinned in a prior process, e.g. at a station upstream of the harvester along the poultry body conveyor.

Poultry body 40 is arranged on a product carrier, generally indicated with reference number 50, of a poultry body conveyor (not shown) conveying the poultry body 40 in a direction of conveyance 55. This is generally done by placing the poultry body 40 on the product carrier 50 in a set-up station. The product carrier subsequently conveys the poultry body along a track, one or more processing stations being arranged along said track in addition to the neck meat harvester. In such additional processing station the front half is processed, which additional process can take place by hand, partly by hand or entirely automated. The neck meat harvesting process according to the present invention is preferably an entirely mechanized or automatic process.

The person skilled in the art is familiar with various sorts of poultry body conveyors having a track and multiple product carriers 50 displaceable along said track, which carriers are each adapted for carrying a poultry body past the neck meat harvester of the present invention. Product carriers of this type are known for example from EP 0254332 and from NL 1014845.

In the shown embodiment, the product carrier 50 comprises a carrier part 52 onto which the poultry body 40 is secured as the carrier part is embodied, e.g. as a cone or mandrel, to be introduced into the body cavity of the poultry, here into the front half. Carrier part 52 is connected to an arm 51 of a carrier main trolley body, in such a manner that it can rotate in a rotation direction P about a horizontal axis 54. The rotational movement of the carrier part 52 here is enabled by a command arm 56, here pivotably connected to the carrier part 52 via axis 57 and to a cam track follower 58 on sliding member 53.

Not shown here is that the arm 51 is rotatable about a vertical axis as well, e.g. by a Geneva-wheel arrangement, so that the front half is movable on command about at least a vertical and a horizontal axis.

With the pivotable carrier part 52, it is e.g. possible to place the poultry body onto the carrier part 52 while the carrier part and thus the neck portion 43 is in an essential vertical position, and subsequently to pivot the poultry body 40 such that the neck portion 43 extends substantially in horizontal direction, preferably perpendicular to the direction of conveyance 55.

It is noted that the rotational motion possibility of the carrier part 52 onto which the poultry body 40 is placed is beneficial in combination with the neck meat harvester, but it is not a prerequisite of a product carrier to be used in combination with a poultry neck meat harvester according to the present invention.

In the shown embodiment, generally indicated with reference number 30, two neck positioning devices 35 of the neck meat harvester are visible, each adapted to receive therein the poultry neck portion while the carcass part 41 is held by the product carrier 50. The neck positioning devices 35 are conveyed along a path by the neck conveyor 31, here the devices are mounted on a chain guided over reversing rollers.

The neck conveyor 31 is provided adjacent and essentially parallel to the poultry body conveyor, having essentially the same speed and direction of conveyance 32 as the direction of conveyance 55 of the poultry body conveyor. From the portion of the neck conveyor 31 shown in FIG. 1, it appears that the neck conveyor 31 in this embodiment is an endless conveyor, of which only a portion of the conveyor has a direction of conveyance essentially the same as the direction of conveyance of the poultry body conveyor.

Figures 6A, 6B:
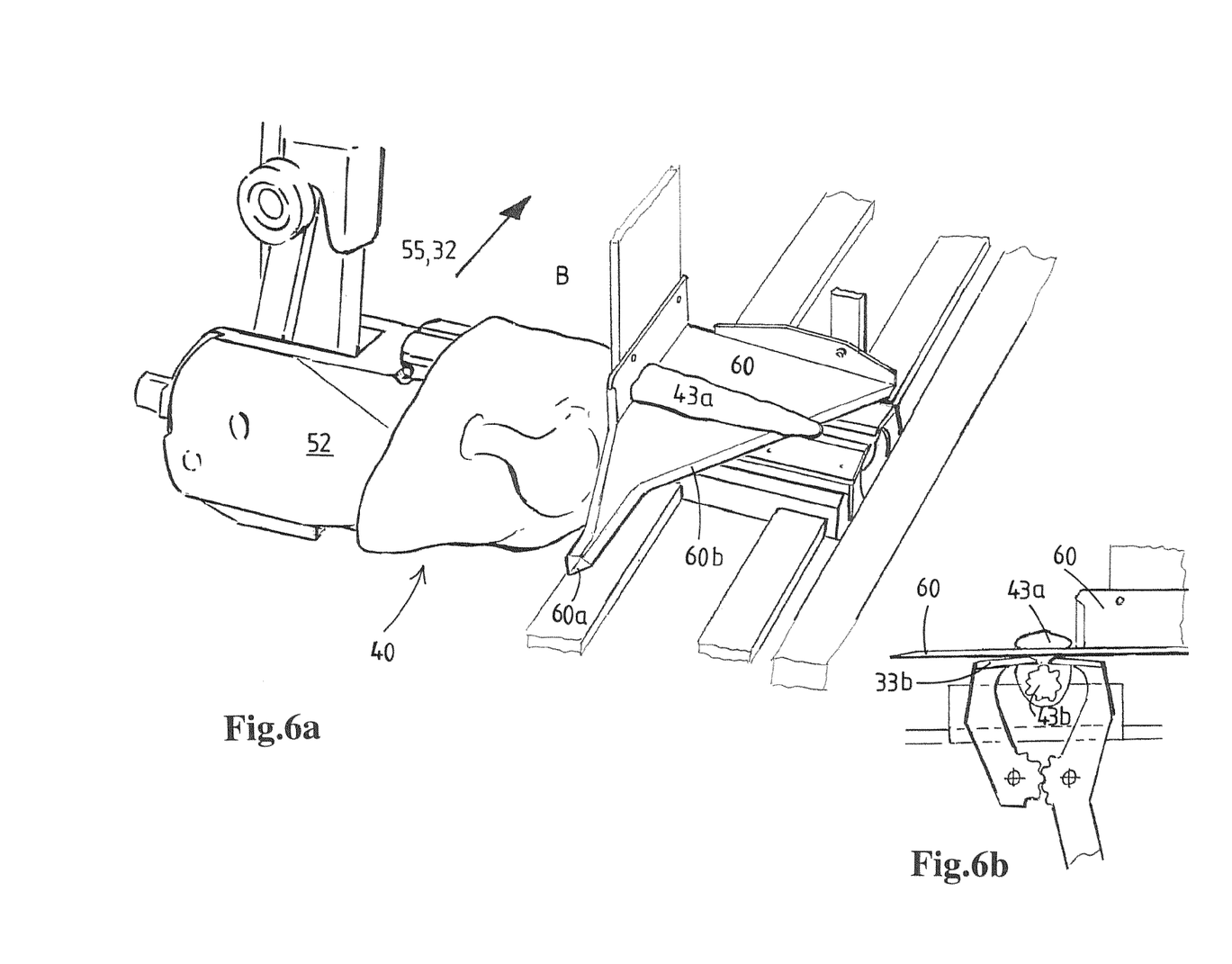
FIG. 6A shows in a perspective view a portion of the neck meat harvester of FIG. 2 at a harvesting position, a more upstream position than the position of FIG. 5.
FIG. 6B shows a neck portion and the poultry neck meat harvester according to the present invention in cross section at a harvesting position.

In particular, the neck conveyor 31 conveys the neck positioning devices 35 at least between a positioning position A wherein the poultry neck portions are positioned in a positioning device 35 and an upstream cutting position B wherein the cut is made in the neck portion to loosen the neck meat from the vertebrae, indicated in and described in detail in relation to FIGS. 6A and 6B.

Figure 7:
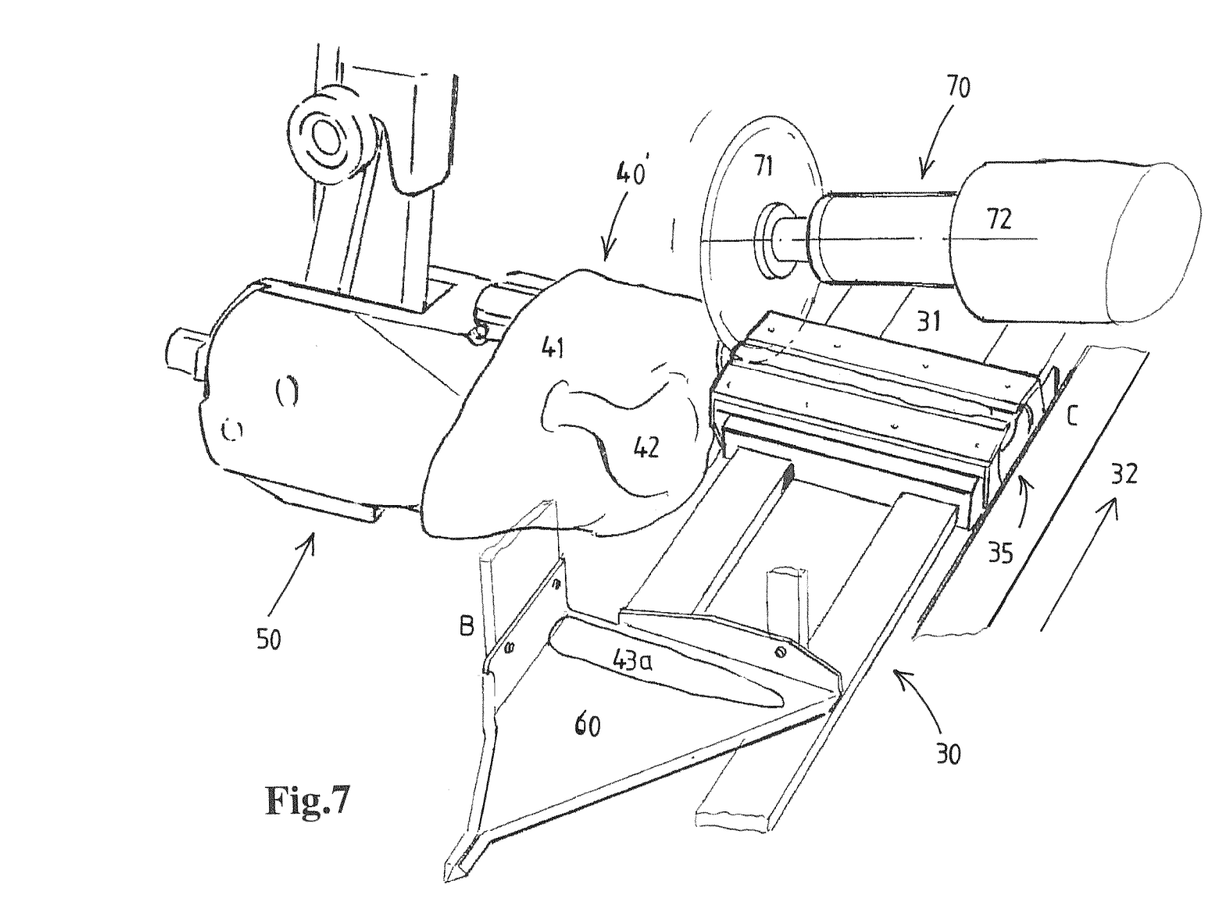
FIG. 7 shows in a perspective view a portion of the poultry neck meat harvester of FIG. 2 at a neck removal position, a more upstream position than the harvesting position of FIG. 6A.
Figure 8:
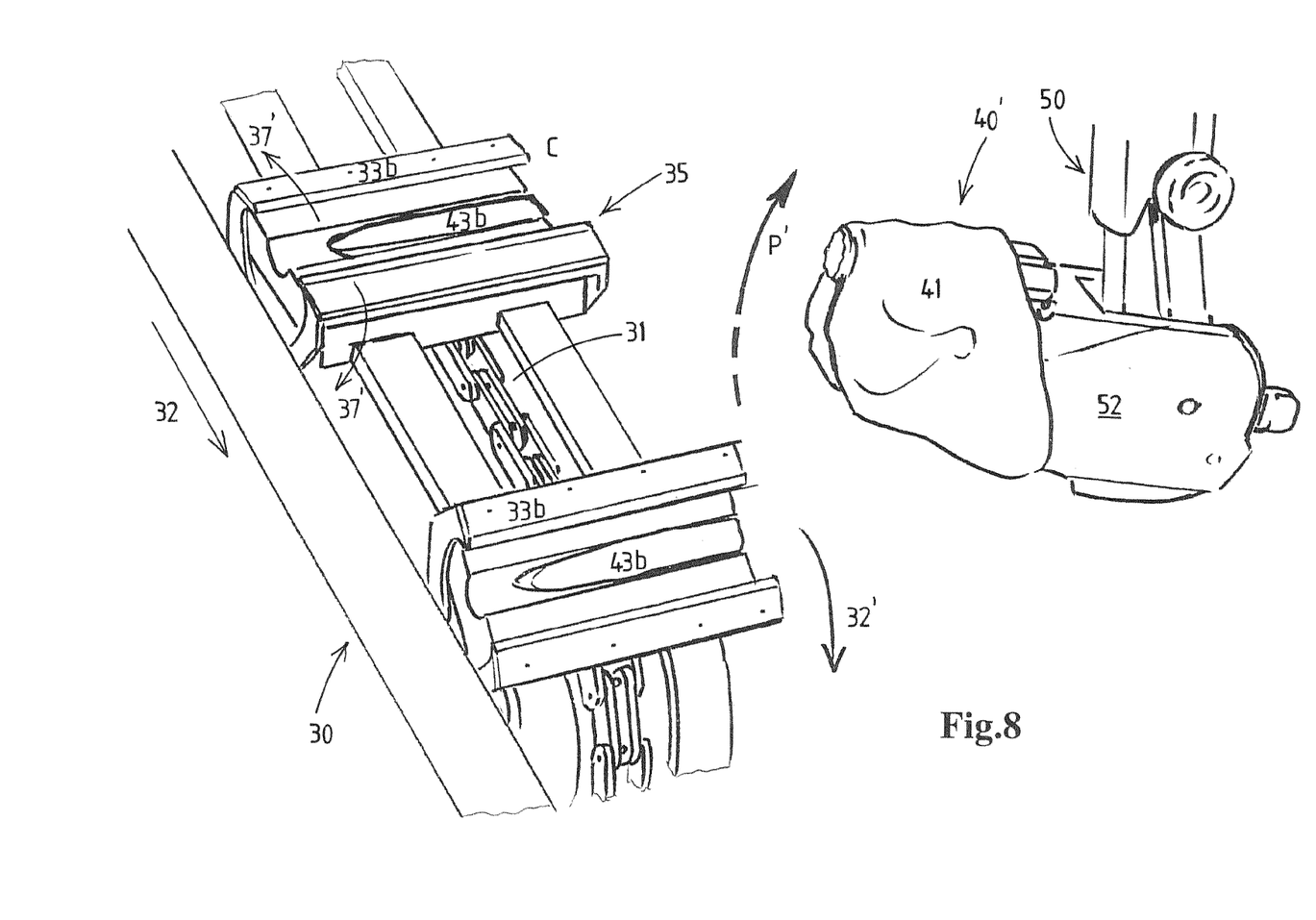
FIG. 8 shows in a perspective view a portion of the poultry neck meat harvester of FIG. 2 at a neck portion removal position, more upstream position than the neck removal position of FIG. 7.

In the shown embodiment, the neck conveyor 31 conveys the neck positioning devices 35 further than the cutting position B to a neck removal position C, indicated in and described in detail in relation to FIGS. 7 and 8, wherein the remainder of the neck portion is removed from the main part of the poultry body, here the front half.

The neck positioning device 35 of the shown embodiment comprises an open topped gully 34 into which the poultry neck portion is placed while it is held in a suitable position and conveyed therein by the product carrier 50. The open gully of this embodiment has a width slightly larger than the projected diameter of a neck portion to facilitate the receiving of the neck portion in the gully.

The gully here has a rigid shape, generally with a width defined by two opposed parallel longitudinal sides. The gully preferably has a length equal to or exceeding the length of the neck portion, such that the entire length of the neck portion can be positioned in the gully.

At the receiving position A it is preferred that the breast side 43a of the neck portion is positioned in the lower portion of the gully 34, and to leave the back side of the neck portion to extend outside, here above, the open gully 34.

In this embodiment, the neck portion 43 is subsequently fixed in the gully before the cutting operation for harvesting the neck meat is effected. The shown neck meat harvester 30 further comprises a guide rod 36 and two elongated fixation members 33b.

Guide rod 36 is provided at a fixed location having a front end positioned upstream of the receiving position A. The guide rod extends adjacent the neck conveyor 31, adjacent the path of the neck positioning devices 35.

In this embodiment, the guide rod 36 is positioned above the conveyor 31. It is also conceivable that the rod is positioned aside the conveyor 31.

The guide rod 36 here extends essentially parallel to the direction of conveyance 32 of the neck conveyor, and converges slightly towards the conveyor 31 to aid in placing the neck portion in the gully 34.

A neck portion 43 positioned in the gully 34 with aid of a guide rod 36 is preferably kept in the gully and prevented from slipping out of the gully by said guide rod until one or more fixation members become active.

Here the position of the guide rod 36 is fixed, but it is envisaged that the guide rod or other guide structure for the neck portion is resiliently mounted to be movable in some degree, e.g. towards the neck conveyor 31, or parallel to the neck conveyor 31.

Figures 3A, 3B:
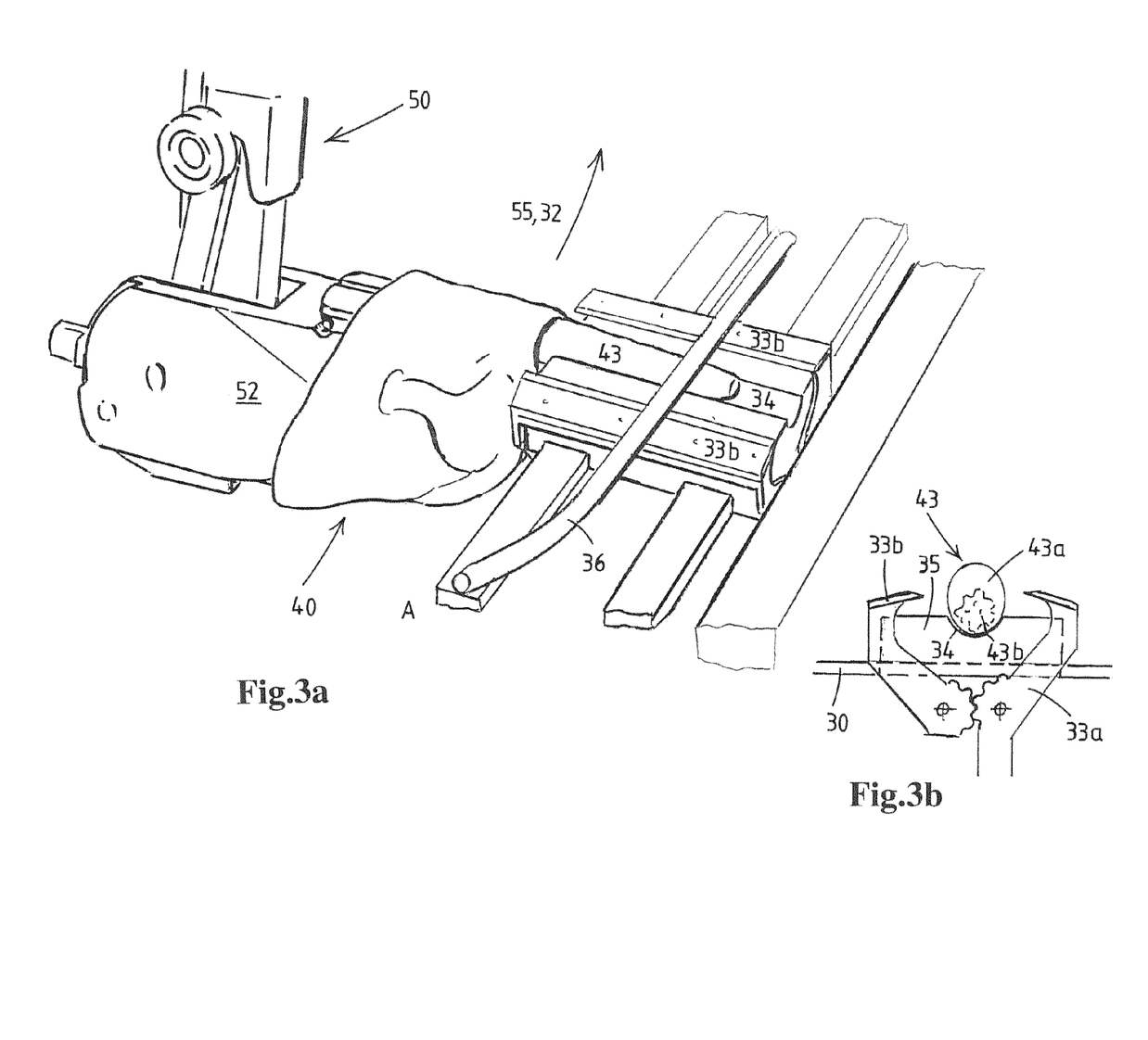
FIG. 3A shows in a perspective view a portion of the poultry neck meat harvester of FIG. 2 at a more upstream position than the positioning position.
FIG. 3B shows a neck portion and the poultry neck meat harvester according to the present invention in cross section at a positioning position.

In FIGS. 3A and 3B a portion of the neck conveyor 31 near the receiving position A is shown in detail, wherein the neck portion 43 is positioned in the gully 34 by aid of the guide rod 36.

In the cross sectional view of FIG. 3B the guide rod is not depicted. The neck positioning device 35 with gully 34 are shown, as well as the neck conveyor 31 on which the neck positioning device 35 is arranged. The neck portion 43 is shown in cross-section, wherein the vertebrae are indicated with reference numeral 43b and the neck meat to be harvested with reference numeral 43a. Said neck meat lies outside the gully.

According to the shown embodiment, the neck positioning device 35 further comprises two elongated fixation blades 33b, here extending parallel to the gully 34 and movable towards and away from each other. In this FIG. 3B cross-section also the elongated fixation blades 33b are visible in cross section. From this view, it is evident that both fixation blades 33b comprise a fixation blade arm 33a. By means of these arms 33a, the fixation blades 33b are movable in a fixation direction 37 between a retracted position, as visible in FIGS. 3A and 3B, and a fixation position as is visible in FIGS. 4A and 4B. In the fixation position the neck portion is effectively clamped over the majority of its length, preferably all of its length, between the blades 33b, generally above the vertebrae 43b as is preferred.

Thus near the receiving position A wherein the neck portion 43 is positioned in the positioning device 35, an optional guide rod or other guide assembly may engage on the neck portion to aid the placement of the neck portion in the gully and to improve the accuracy of neck positioning in the positioning device 35.

Downstream thereof the optional fixation blades 33b of the positioning device 35 are allowed to move from a retracted position in a fixation direction 37 to a fixation position, wherein the neck may be positioned with even further accuracy and held securely in said position.

Figures 4A, 4B:
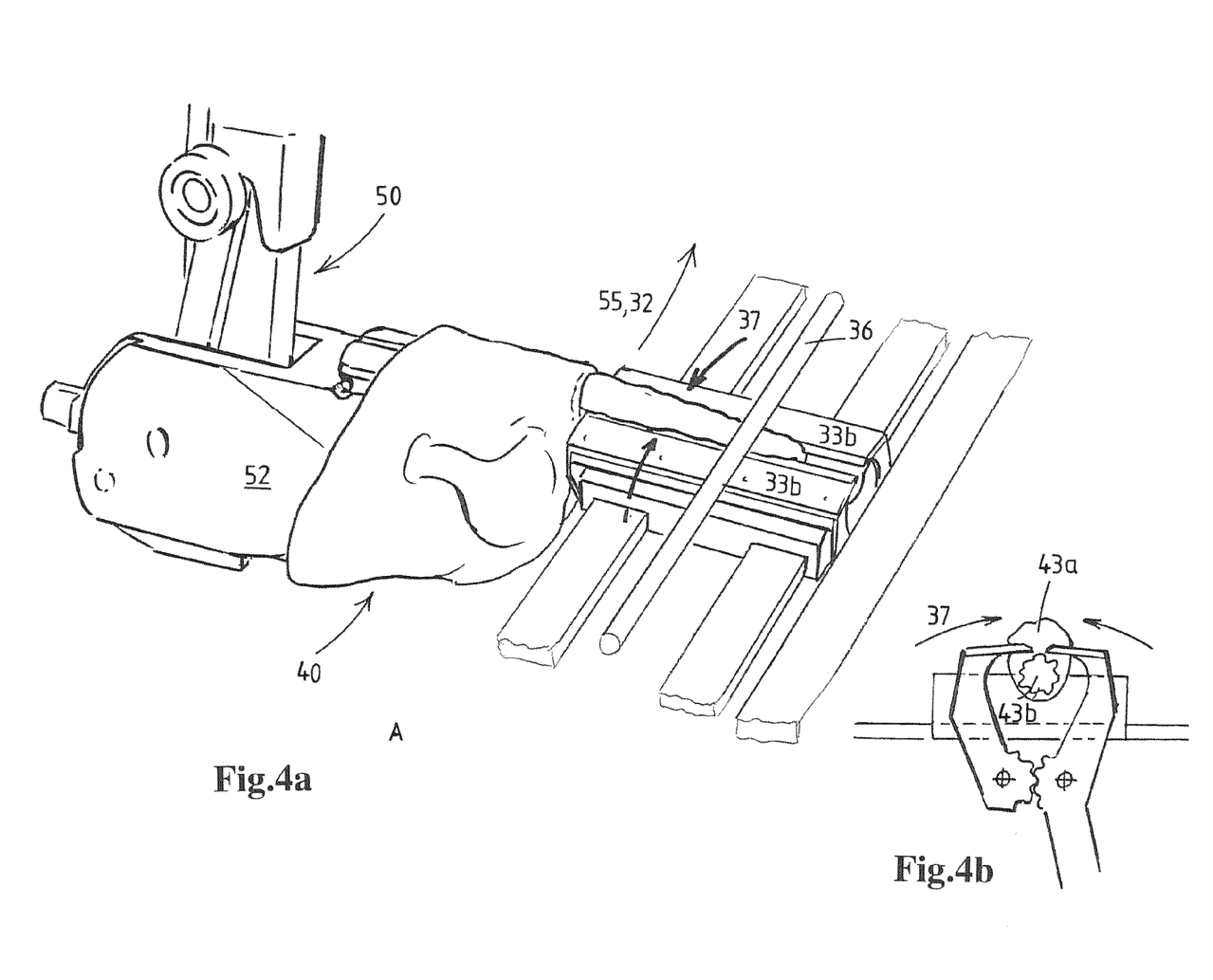
FIG. 4A shows in a perspective view a portion of the poultry neck meat harvester of FIG. 2 at a fixation position, a more upstream position than the positioning position of FIG. 3A.
FIG. 4B shows a neck portion and the poultry neck meat harvester according to the present invention in cross section at a fixation position.

An advantage of the fixation blades 33b or similar elongated fixation members engaging on opposed sides on the neck portion, which advantage is visible in FIG. 4B, is the 'roll-up' or "press-up" effect achieved by the fixation blades 33b, as a result of which most of the neck meat 43a is pulled away from the vertebrae and accumulated above the fixation blades 33b.

It is noted that not only the neck conveyor 31 with the neck portion 43 is being conveyed further in the direction of conveyance 32, but also the remaining poultry body 40 being arranged on the product carrier 50 is conveyer further by the poultry body conveyor in essentially the same direction of conveyance 55, with essentially the same speed of conveyance.

Figure 5:
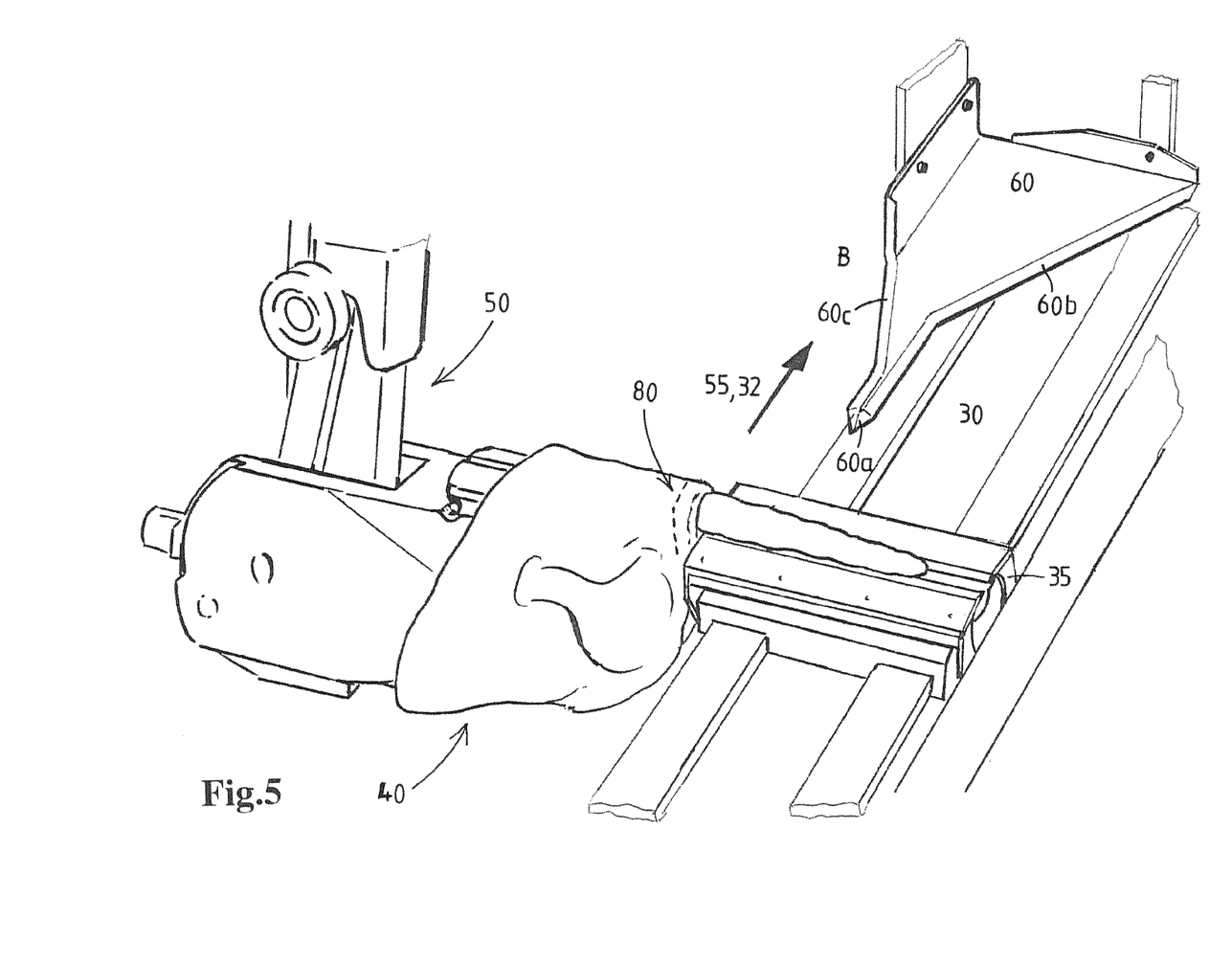
FIG. 5 shows in a perspective view a portion of the poultry neck meat harvester of FIG. 2 at a more upstream position than the fixation position of FIG. 4A.

In FIG. 5, the cutting position B of the neck conveyor 31 is visible, wherein the neck meat is being cut loose from the vertebrae. In FIG. 5, the neck meat 43 in the neck positioning device 35 has not yet arrived at this position B, but in FIG. 6 it has achieved this position.

At the position B, a neck meat cutting blade 60 is provided for cutting loose the neck meat from the vertebrae, generally with a cut extending parallel to the vertebrae. The blade 60 is positioned adjacent the path formed by the conveyor 31, here at a stationary location, the blade being a stationary blade in this example. In this embodiment, the neck meat cutting blade 60 is positioned at a fixed distance above the path of the devices 35.

In this example the cutting blade has a sharp tip 60a at the front end, making an initial piercing into the neck portion. A cutting edge 60b leads away from this tip 60a to effect a gradual cut away from the initial piercing, said cut extending substantially parallel to the vertebrae. The cutting edge 60b here, when seen from above, is formed by a wing portion of the blade 60.

The length of the cutting edge 60b is such that the cut extends all the way to the free end of the neck portion.

Here, as is preferred, the blade 60 also includes a cutting edge 60c leading from the sharp tip in upward direction to completely cut the neck meat loose. This edge 60c can, as is shown, also extend somewhat towards the rib cage part of poultry body, allowing the initial piercing to be somewhat spaced from the shoulder area of the poultry body.

As indicated with dotted line 80 in FIG. 5 the neck meat cutting action may cause an adjoining region of the front halve to be included in the harvested neck meat.

As is preferred the neck meat cutting blade 60 is positioned adjacent the neck meat conveyor 31, in particular closely above the path of the fixation blades 33b in the fixation position. The operation is visible in FIGS. 6A and 6B, wherein the cutting blade 60 has cut the neck meat 43a from the remaining neck portion including the vertebrae 43b, just above the fixation blades 33b in their fixation position.

Figure 9A:
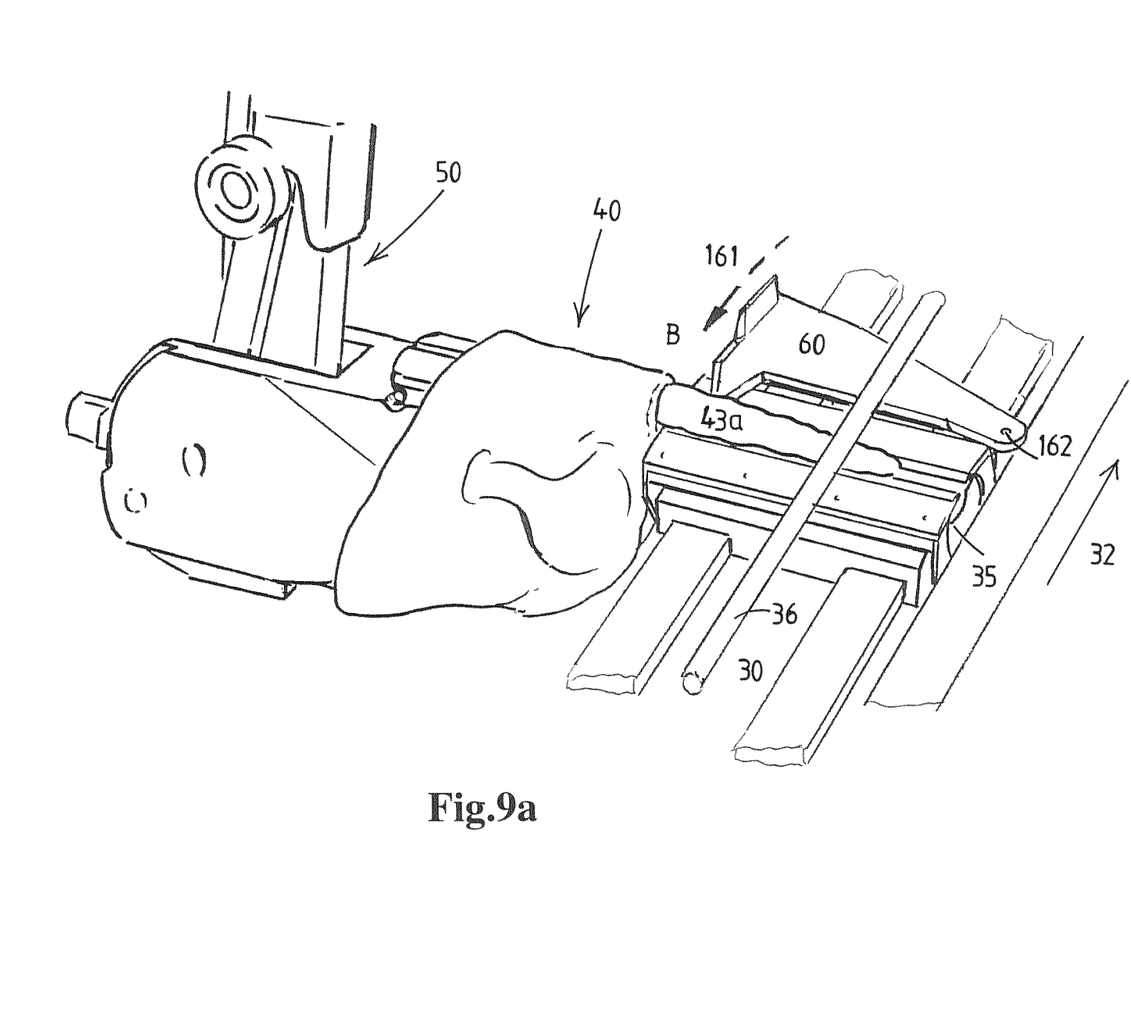
FIGS. 9A and 9B show in a perspective view a portion of and alternative neck meat harvester according to the invention at a harvesting position.
Figure 9B:
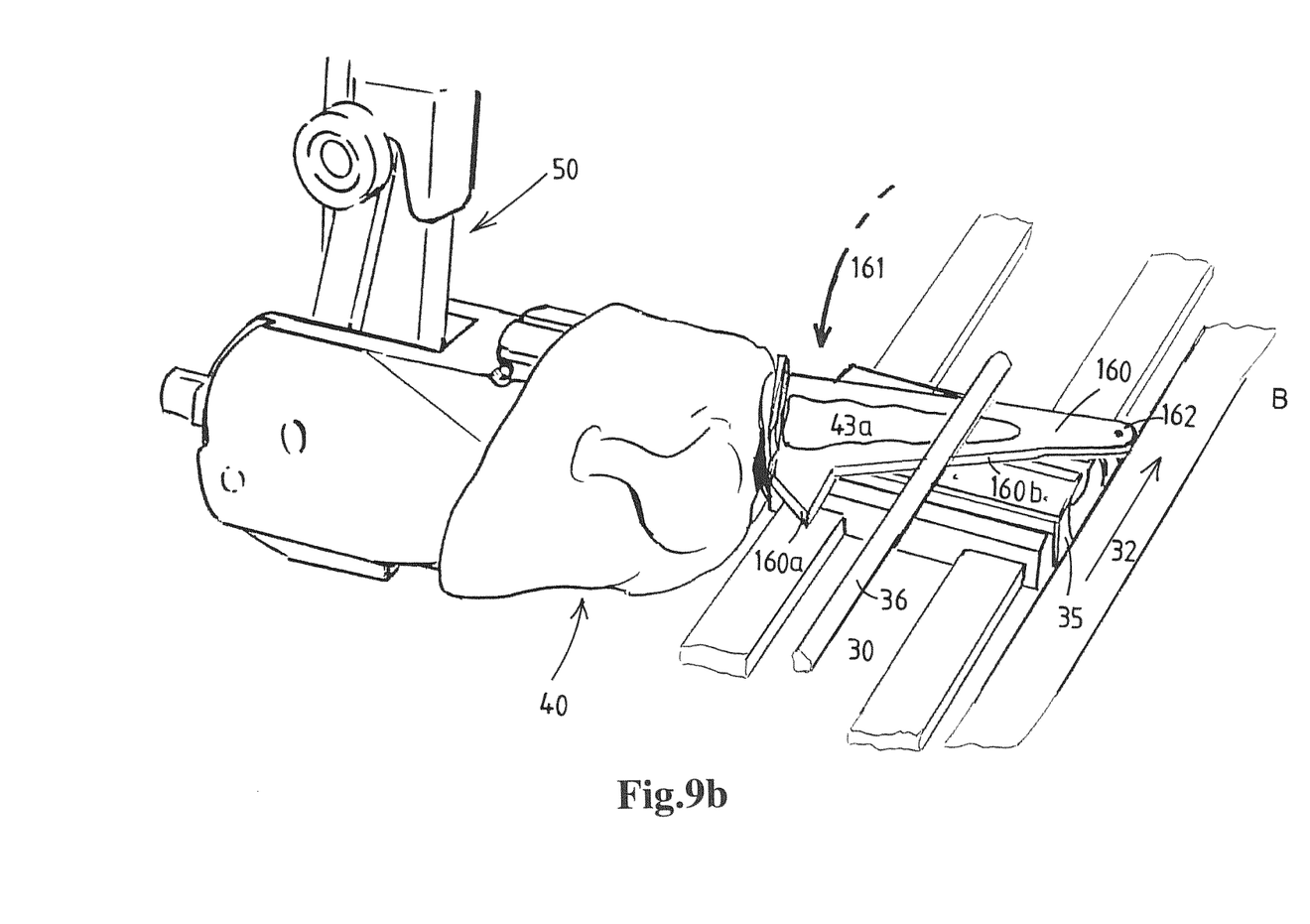

An alternative neck meat cutting blade 160 is shown in FIGS. 9A and 9B. In this embodiment, the neck meat cutting blade 160 is also positioned adjacent the neck conveyor 31 and the position of the fixation blades 33b in the fixation position. The neck meat cutting blade 160 extends essentially parallel to the direction of conveyance 32 of the neck conveyor. The cutting blade has a sharp tip 160a to enter the neck portion and flares outwards to a width in the upstream direction of the neck meat conveyor 31, here with a wing 160b, still adjacent and parallel to the conveyor 31. The upstream width of the cutting blade 60 is essentially the same as the length of the neck portion, and here the length of the neck meat positioning device 35, to be able to cut the neck portion over its entire length.

In this embodiment, the neck meat cutting blade 160 is resiliently mounted, such that the neck meat cutting blade 160 is movable generally opposite the direction of conveyance 32, to enter the neck meat 43a. In the shown embodiment, an end of the wing 160b of the neck meat cutting blade is fixed, about which axis 162 the neck meat cutting blade is pivotable in a direction 161, essentially opposite the direction of conveyance 32. Alternative configurations enabling the same movement opposite the direction of conveyance 32 are also conceivable.

It is noted that in FIGS. 5-7 the guide rod 36 does not extends above the neck portion as the cut therein is made. In the embodiment of FIGS. 9A and 9B the guide rod 36 is also present at said location.

As is visible in FIGS. 7 and 9B, the neck meat 43a that has been fully cut loose from the vertebrae comes to lie on the cutting blade 60 and 160 resp. Subsequently, (not shown) the neck meat 43a is removed from the cutting blade 60, 160. Possibly, the neck meat is collected in a harvested neck meat collection container, provided adjacent the neck meat conveyor 31 and the cutting blade, at the position B.

In FIGS. 7 and 8 the neck removal position C is visible, where the poultry neck meat harvester 30 is provided with neck removal cutting means 70, positioned adjacent the neck meat conveyor 31 for cutting off the remaining neck portion including the vertebrae 43b but here without the neck meat 43a from the remaining poultry body 40'.

Neck removal cutter assembly 70 comprises in this embodiment a rotating disc blade 71, powered by a motor unit 72.

The neck removal cutter blade 71 is positioned to extend substantially parallel to the direction of conveyance 32 of the neck conveyor, perpendicular to the neck portion 43.

Thus, the remaining neck portion including the vertebrae 43b is severed from the remaining poultry body 40' by conveying the poultry body 40 with the neck portion 43 in the direction of conveyance 55, 32, thereby allowing the neck removal cutting assembly to perform its cutting action. After this cut has been made, the remaining neck portion including the vertebrae 43b is still positioned in the positioning device 35 as visible in FIG. 8, while the remaining poultry body 40' remains arranged on the product carrier 50. As visible in FIG. 8, the carrier part 52 may optionally be allowed to pivot in a pivot direction P', opposite the pivot direction P in FIG. 2, to move away from the neck meat harvester 30. As such, the poultry body 40' can be conveyer further for further processing.

The remaining neck portion including the vertebrae 43b which is positioned in the positioning device 35 may be removed by moving the fixation blades 33b in a direction 37' opposite the fixation direction 37 shown in FIGS. 4A and 4B, to the retracted position (as also visible in FIGS. 3A and 3B). As such, the remaining neck portion including the vertebrae 43b is positioned in the open gully 34, but no longer fixed in this position.

As visible in the embodiment of FIG. 8, it is possible to remove the neck portion from the positioning device 35 by a change in direction of conveyance of the neck meat conveyor 31, the new direction of conveyance 32' being such that due to gravity, the remaining neck portion including the vertebrae 43b falls out of the positioning device 35, possibly in a neck portion collection container.

The invention claimed is:

1. Poultry neck meat harvester for mechanized harvesting of neck meat from a slaughtered, deheaded, and eviscerated poultry body comprising a carcass part having at least part of the rib cage and part of the meat which is naturally present thereon and comprising a neck portion with neck vertebrae and at least part of the meat which is naturally present thereon, wherein the neck meat harvester is adapted to be arranged along the path of a poultry body conveyor having at least one product carrier embodied to support a poultry body and to convey said poultry body in a direction of conveyance, wherein the poultry neck meat harvester comprises:

one or more neck positioning devices, each adapted to receive and position the poultry neck portion of a poultry body that is supported by a product carrier of the poultry body conveyor, a neck conveyor comprising the one or more neck positioning device, said neck conveyor being adapted to convey each neck positioning device in a manner that is synchronized with a product carrier so as to allow to receive—at a receiving position—the poultry neck portion whilst the poultry body is supported by the product carrier of the poultry body conveyor, a neck meat cutting member adapted to cut loose the neck meat from the neck vertebrae whilst the neck portion is received and positioned by the neck positioning device.

2. Poultry neck meat harvester according to claim 1, wherein the neck meat cutting member is arranged at a cutting position along the path of the neck conveyor, said cutting position being downstream of the receiving position.

3. Poultry neck meat harvester according to claim 1, wherein each neck positioning device is provided with a neck meat cutting member.

4. Poultry neck meat harvester according to claim 1, wherein the neck conveyor is an endless conveyor having a path of which a section is substantially parallel to the path of the poultry body conveyor.

5. Poultry neck meat harvester according to claim 1, wherein the neck meat harvester further comprises a neck removal cutter member that is adapted to cut the neck portion from the remaining portion of the poultry body.

6. Poultry neck meat harvester according to claim 5, wherein the neck removal cutter member is arranged downstream of the location where the neck meat cutting member cuts loose the neck meat from the vertebrae.

7. Poultry neck meat harvester according to claim 5, wherein the neck removal cutter member is arranged upstream of the location where the neck meat cutting member cuts loose the neck meat from the vertebrae.

8. Poultry neck meat harvester according to claim 1, wherein the neck meat cutter member is embodied as a cutting blade arranged at a cutting position along the path of the neck conveyor so that the cutting blade cuts into a neck portion that is conveyed past the cutting blade by the neck conveyor.

9. Poultry neck meat harvester according to claim 8, wherein the cutting blade has a sharp tip adapted to create an initial piercing into the neck portion and a cutting edge arranged to make a cut in the neck portion leading away from the initial piercing by the sharp tip.

10. Poultry neck meat harvester according to claim 1, wherein each neck positioning device comprises an open topped gully into which the poultry neck portion is to be placed at the receiving position.

11. Poultry neck meat harvester according to claim 10, wherein each neck positioning device comprises one or more operable fixation members that are movable between a retracted position allowing the neck positioning device to receive a neck portion and a fixation position wherein the one or more fixation members engage on the neck portion to fix the position thereof.

12. Poultry neck meat harvester according to claim 11, wherein the neck position device comprising two operable elongated fixation members that are adapted to engage in a clamping manner on the neck portion at opposed longitudinal sides thereof.

13. Poultry neck meat harvester according to claim 1, wherein each neck positioning device comprises one or more operable fixation members that are movable between a retracted position allowing the neck positioning device to receive a neck portion and a fixation position wherein the one or more fixation members engage on the neck portion to fix the position thereof 14. Poultry neck meat harvester according to claim 13, wherein the neck position device comprising two operable elongated fixation members that are adapted to engage in a clamping manner on the neck portion at opposed longitudinal sides thereof.

15. Poultry neck meat harvester according to claim 1, wherein the neck position device comprises an open topped gully to receive the neck portion therein, and wherein the neck meat harvester comprises an elongated guide extending along the path of the neck positioning device in the region of the receiving position, such that—in use—the neck portion slides underneath said guide and is thereby lead and/or maintained in the gully.

16. In combination:
   a poultry neck meat harvester according to claim 1;
   a poultry body conveyor adapted to convey one or more poultry bodies in a direction of conveyance in a path past the neck meat harvester, comprising one or more product carriers each adapted for carrying a slaughtered, deheaded, and eviscerated poultry body comprising a carcass part having at least part of the rib cage and part of the meat which is naturally present thereon and a neck portion comprising neck vertebrae and at least part of the meat which is naturally present thereon.

17. The combination of claim 16, wherein the poultry body conveyor comprises product carriers that are each adapted to support poultry body formed as a front half, each carrier comprising a cone or mandrel adapted to be introduced into the body cavity of the front half, each carrier supporting the cone or mandrel thereof so as to be rotatable on command about multiple distinct axes of rotation.

18. The combination of claim 16, wherein the poultry body conveyor comprises product carriers that are each adapted to support the poultry body such that the poultry body is rotatable on command about multiple axis of rotation, and wherein the poultry body conveyor is configured to perform rotational motion of the poultry body in order to engage the neck portion thereof with a neck positioning device.

19. Method for mechanized harvesting of neck meat from a slaughtered, deheaded, and eviscerated poultry body comprising a carcass part having at least part of the rib cage and part of the meat which is naturally present thereon and comprising a neck portion with neck vertebrae and at least part of the meat which is naturally present thereon,
   wherein use is made of a neck meat harvester that is arranged along the path of a poultry body conveyor having at least one product carrier supporting a poultry body and conveying said poultry body in a direction of conveyance,
   wherein the poultry neck meat harvester comprises:
   one or more neck positioning devices, that each receive and position the poultry neck portion of a poultry body that is supported by a product carrier of the poultry body conveyor,
   a neck conveyor comprising the one or more neck positioning devices, said neck conveyor conveying each neck positioning device in a manner that is synchronized with a product carrier so as to perform a receiving action—at a receiving position—of the poultry neck portion whilst the poultry body is supported by the product carrier of the poultry body conveyor,
   a neck meat cutting member that cuts loose the neck meat from the neck vertebrae whilst the neck portion is received and positioned by the neck positioning device.

20. Method according to claim 19, wherein the harvesting of the neck meat by the neck meat cutting member takes place while conveying the poultry body with the neck portion in the direction of conveyance, said conveyance causing the introduction of the cutting member into the neck meat and cutting loose the neck meat from the neck vertebrae.

* * * * *